Jan. 3, 1956 — W. R. FRANK — 2,729,043

ADJUSTABLE BEARING CONNECTION

Filed Sept. 2, 1952

*INVENTOR.*
WILLIAM R. FRANK
BY
ATTORNEYS

United States Patent Office 2,729,043
Patented Jan. 3, 1956

2,729,043

ADJUSTABLE BEARING CONNECTION

William R. Frank, Bell, Calif., assignor to John Deere Killefer Company, Los Angeles, Calif., a corporation of California Application September 2, 1952, Serial No. 307,491

10 Claims. (Cl. 55—30)

The present invention relates generally to agricultural implements and more particularly to a self-aligning bearing construction especially adapted for disk harrows and similar implements.

The object and general nature of the present invention is the provision of a self-aligning bearing arrangement for disk harrows wherein the connection between the gang frame and the bearing units of each gang of disks is such that the bearing yoke may shift both bodily in a generally horizontal plane and arcuately around a generally vertical axis, thereby preventing any variations in the frame and/or disks, due to manufacturing tolerances or the like, from causing misalignment of the bearing parts.

More specifically, it is a feature of this invention to provide means for pivotally connecting a bearing yoke-receiving part with a clamping unit and to connect the clamping unit with a bearing bracket for shifting or translational movement, preferably in the general direction of the axis of the disks, relative to the gang frame.

These and other objects and advantages of the present invention will be apparent to those skilled in the art after a consideration of the following detailed description, taken in conjunction with the accompanying drawings, in which.

Figure 1:
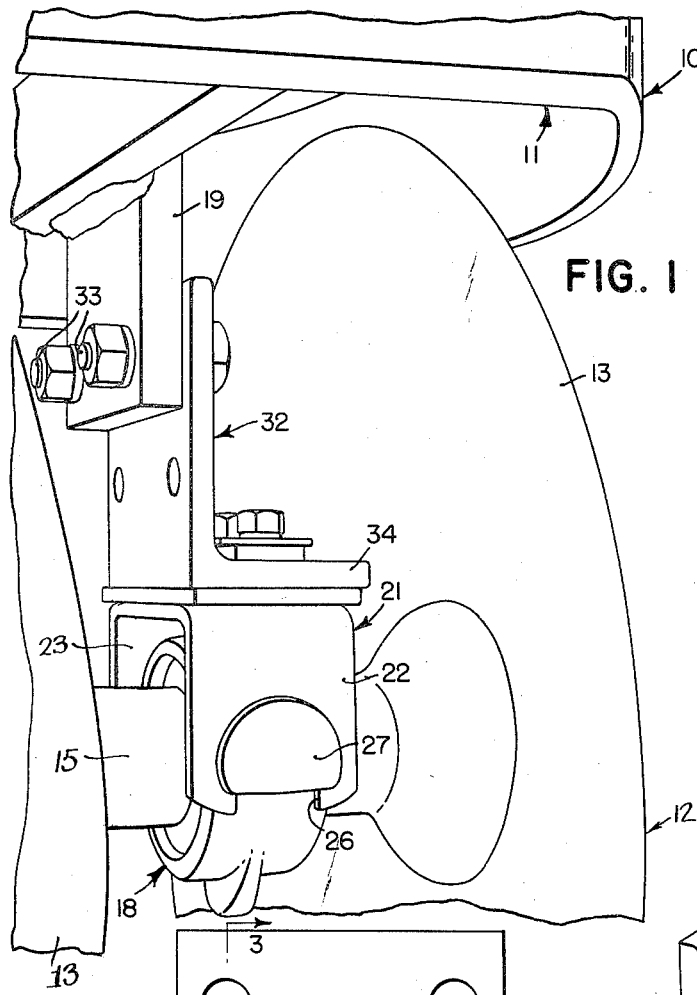
Figure 1 is a fragmentary perspective view, showing the bearing means of the present invention and a portion of the associated disk gang and gang frame.
Figure 3:
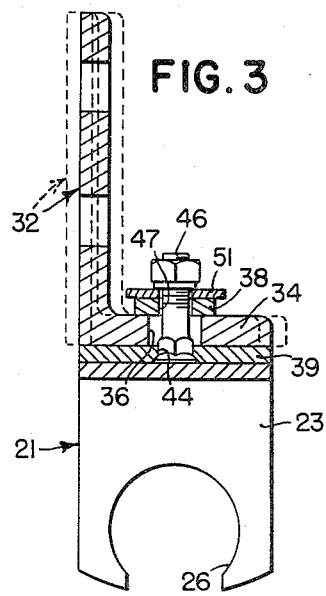
Figure 3 is a sectional view taken generally along the line 3—3 of Figure 2.
Figure 2:
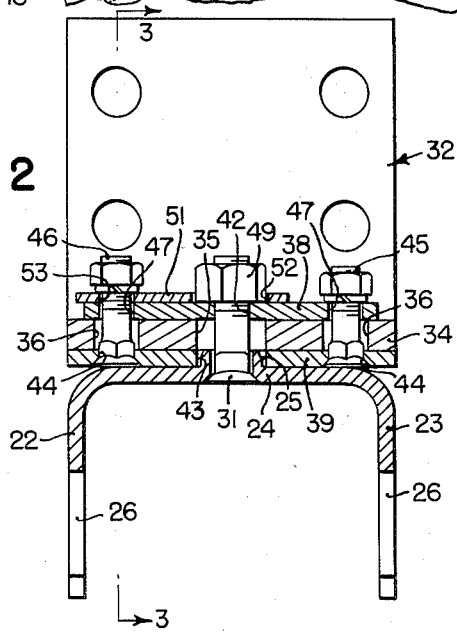
Figure 2 is a sectional view taken along a vertical transverse plane.
Figure 4:
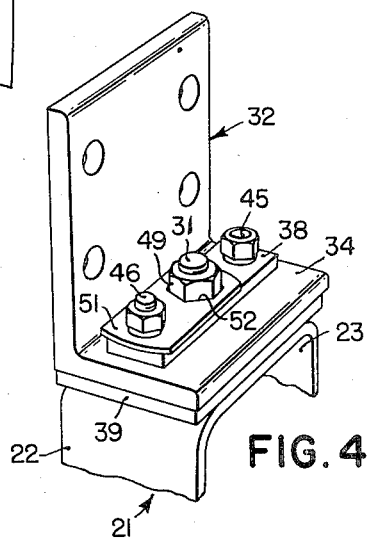
Figure 4 is a fragmentary perspective view showing the center nut locking means.

Referring now to the drawings, particularly Figures 1 and 2, for the purpose of illustrating and describing the present invention the same has been shown as applied to a disk harrow 10 having a gang frame 11 in which a disk gang 12, including a plurality of disks 13, and a plurality of disk-separating spacing means 15, is mounted for rotation, preferably by means of a gang bearing unit 18 connected to a bracket 19 that is fixed in any suitable way to and forms a part of the gang frame 11.

The present invention is particularly concerned with an adjustable mounting arrangement for the bearing unit 18 and the mounting arrangement will now be described.

A pivot yoke 21 comprises a generally U-shaped member having legs 22 and 23 and an apertured central portion 24 formed on its upper side with a generally cylindrical boss section 25. The leg portions 22 and 23 of the yoke 21 are notched, as at 26, to receive the trunnions 27 that form a part of the bearing unit 18. The boss section 25 is apertured to receive a countersunk square head bolt or pivot member 31 to which more detailed reference will be made below. The aperture in the boss section 25 receiving the head of the bolt 31 is square so that the shank of the bolt 31 fits non-rotatably in the aperture, and thus the bolt 31 is prevented from rotating relative to the yoke. The yoke 21 is rotatably and shiftably connected with an angle bracket 32 that is adapted to be secured, as by bolts 33, to the bracket 19. The angle bracket 32 includes a horizontal flange section 34 having an enlarged central opening 35 and a pair of elongated openings or slots 36, one on each side of the central opening 35. As best shown in Figure 2, the diameter of the central opening 35 is considerably larger than the diameter of the bolt 31, whereby the latter may be shifted in any direction, within limits, within the opening 35.

The yoke 21 is adapted to be adjustably but fixably connected with the flange 34 of the bracket 32 by means of a pair of clamping plate members 38 and 39. The upper member 38 is in the nature of a strap and the lower member 39 is in the nature of a plate having about the same width as the width of the bracket flange 34. Both of the plate members 38 and 39 are provided with central and end openings. The strap member 38 has a central opening 42 of substantially the same diameter as the diameter of the bolt 31 and the central opening 43 in the lower plate member 39 has a diameter that is about the same as the diameter of the boss section 25 on the yoke 21, whereby the boss section is snugly but rotatably received within the opening 43 of the lower plate member 39. The latter member has end openings 44 that are formed as square sockets, adapted thereby to receive the square heads of a pair of plow bolts 45 and 46 of the type having countersunk heads. The upper plate member or strap 38 has end openings 47, the diameter of which is substantially the same as the diameter of the bolts 45 and 46. It will be noted that the two clamping members 38 and 39 are held against shifting relative to the yoke 21, by virtue of the snug fit of the boss 25 within the central opening 43 of the lower plate 39, yet both of the clamping plates 38 and 39 may shift relative to the bracket 32 in a direction parallel to the elongated slots 36. After the proper adjustment has been made, the nuts on the plow bolts 45 and 46 are then tightened which serve to retain the desired adjustment yet the yoke 21 may pivot relative to the clamping plates and the bracket plate 32 to which they are fixed. Any relative rotation that does occur causes the bolt or pivot member 31 to turn or pivot in the clamping plates, and therefore some means should be provided to keep the nut 49 on the central bolt 31 from loosening. To this end, I provide a nut lock in the form of a strap 51 having a hexagonal opening 52 and adjacent the other end a smaller opening 53, the diameter of which latter opening is equal to that of the plow bolt 46, the latter being slightly longer than the bolt 45, as will be clear from Figure 2. The nut lock plate 51 is of such length as to embrace the center bolt 31 and the end bolt 46. Therefore, when the nut 49 is tightened the desired amount, after the required adjustment has been made, the nut lock plate 51 is applied over the nut 49 and then secured in place by the nut on the bolt 46.

By virtue of the adjustable mounting of the present invention, an implement such as a disk harrow may be set up so that manufacturing and other tolerances can readily be accommodated. For example, there may be some variation in the length of the spools or spacers 15 as well as of the thicknesses of the several disks 13. Therefore, in order to prevent imposing unnecessary strains and stresses on the bearing means, the present invention provides means for adjusting the position of the bearing unit relative to the bracket means that connects the same to the gang frame. This adjustment is also of considerable advantage to the farmer if, for example, it should be necessary to replace one or more of the disks 13. Replacement disks may be of slightly different thickness than the original disks and, therefore, when one, two or more of the disks have been replaced the length of the gang may not be exactly the same as it was in the original harrow. Therefore, when installing new disks, all the farmer has to do, so far as preventing overstressing the bearings is concerned, is to loosen the three bolts when setting up the harrow with the replacement disks and thus permitting the bearing unit to shift its position relative to the gang frame, if necessary. After the disks have been replaced in the gang and the latter installed in the harrow frame, the bolts are tightened and such adjustment is thereby retained. The center bolt is drawn up moderately tight, sufficient to hold the parts in assembled relation, but not sufficient to prevent any slight rotation of the yoke 21.

While I have shown and described above the preferred structure in which the principles of the present invention have been incorporated, it is to be understood that my invention is not to be limited to the particular means, shown and described above, but that, in fact, widely different means may be employed in the practice of the broader aspects of my invention.

What I claim, therefore, and desire to secure by Letters Patent is:

1. In a disk harrow that includes a gang frame, a gang of disks carried thereby, and bearing means rotatably supporting said gang in said frame, the improvement residing in connecting means between the individual bearing means and the frame, said connecting means comprising a bearing bracket attachable to said gang frame and having a pivot-receiving opening, a bearing yoke adapted to receive said bearing means, a pivot bolt carried by said yoke and extending through said bracket opening, the latter being sufficiently larger than said pivot bolt to permit said yoke and pivot to shift relative to said bracket, clamping plate means having an opening rotatably but non-shiftably receiving said pivot bolt, whereby the bearing yoke may pivot relative to said clamping plate means but is restrained against shifting laterally relative to the pivot bolt, and means shiftably connecting said clamping plate means with said bracket.

2. The invention defined in claim 1, further characterized by said bearing yoke having an apertured boss receiving said pivot bolt, the pivot boss being smaller than the pivot-receiving opening in said bearing bracket, whereby said boss and said pivot bolt are shiftable in said opening, the clamping plate means having a first opening rotatably but non-shiftably receiving said boss and a second opening rotatably but non-shiftably receiving said pivot bolt.

3. In a disk harrow that includes a frame, a gang of disks, and bearing means rotatably supporting said gang in said frame, the improvement comprising a bearing bracket attachable to said frame and having a flange and said flange having a central opening and a pair of elongated openings on opposite sides of said flange and carrying a central pivot bolt and a pair of clamping bolts extending through the openings in said flange, a pair of clamping members apertured to receive said pivot bolt and said clamping bolts, said bolts and clamping members being shiftable bodily relative to said flange, and a bearing-receiving yoke apertured to receive said pivot bolt and connected by the latter to pivot relative to said clamping members.

4. In a disk harrow that includes a frame, a gang of disks, and bearing means rotatably supporting said gang in said frame, the improvement comprising a bearing bracket attachable to said frame and having a pivot-receiving opening, a bearing yoke adapted to receive said bearing means and carrying an apertured pivot boss, a pivot bolt carried by said yoke and extending through said apertured pivot boss and said bracket opening, said pivot bolt being shiftable in said opening, an adjustment plate having a generally central opening snugly receiving said yoke boss, the latter being turnable in said central opening, and a pair of bolt-receiving openings, a pair of clamping bolts in said openings, said bracket having a pair of openings shiftably receiving said clamping bolts, an adjustment strap having a pair of openings to receive said clamping bolts and a central opening receiving said pivot bolt, said adjustment strap and adjustment plate lying on opposite sides of the apertured portion of said bearing bracket, whereby tightening said clamping bolts serves to hold said adjustment strap and plate, together with the associated pivot bolt, to said bearing bracket against shifting movement relative thereto, a nut on said pivot bolt acting against the outer side of said adjustment strap for holding said yoke in assembled relation with said adjustment plate and strap and said bracket, and a nut lock carried by said adjustment strap and engageable with said nut and one of said clamping bolts for holding said nut against loosening.

5. In a farm implement, including a frame, a part rotatable therein, and bearing means therefore, the improvement residing in connecting means between said bearing means and said frame, said connecting means comprising a bearing bracket attachable to said frame and having two outer and one centrally located apertures, said outer apertures being elongated, a pair of clamping plates, said bracket being disposed between said clamping plates, each of said clamping plates having two outer and one centrally located opening generally registered with the three apertures of the said bracket, two clamping bolts extending through the said outer openings and said outer apertures, said outer openings and said bolts being generally of the same diameter, said bolts and clamping plates being shiftable bodily relative to said bracket, a bearing receiving yoke having an aperture therein, a pivot bolt extending through said aperture, said centrally located openings and said centrally located aperture in said bracket, said centrally located aperture being of sufficient size to permit pivotal and shiftable movement relative to said pivot bolt, said clamping plates being pivotable relative to said pivot bolt, and means securing said pivot bolt to said yoke for preventing pivotal movement of said pivot bolt relative to said yoke.

6. In a farm implement including a frame, a part rotatable therein, a bearing means therefor, and a bearing receiving yoke, the improvement residing in clamping means connecting said yoke to said frame, said clamping means comprising an upper, lower, and intermediate plate in general parallelism to one another, each plate having apertures, said apertures being registered with the apertures of the other plates, said plates carrying clamping bolts extending through said apertures, the apertures of said intermediate plate being elongated to permit shiftable movement of said intermediate plate relative to said upper and lower plates, a pivot bolt extending through a central opening of the said plates, the opening of said intermediate plate being sufficiently large to permit shiftable and pivotal movement relative to said pivot bolt, the openings in said upper and lower plates being sufficient to permit pivotal movement of said bolt, means for fixing said pivot bolt to said yoke and means for rigidly connecting said center plate to said frame.

7. In a farm implement including a frame, a part rotatable therein, and bearing means therefor, the improvement residing in connecting means between said bearing means and said frame, said connecting means comprising a yoke adapted to receive the bearing means, and carrying an apertured pivot boss, three generally parallel plates comprising upper, lower and intermediate plates, each plate having apertures in register with the apertures of the other plates, clamping bolts extending through said apertures, the apertures of said intermediate plate being elongated to permit shiftable movement of said intermediate plate relative to said upper and lower plates, said lower plate having a central opening pivotally receiving said boss, said upper and intermediate plates having central openings in register with said central opening of the lower plate, a pivot bolt extending through said openings and said apertured pivot boss, the opening of said intermediate plate being of sufficient size to permit pivotal and shiftable movement relative to said pivot bolt, said pivot bolt being pivotable in said central opening of said upper plate, means fixing said pivot bolt to said yoke, and means for rigidly attaching said intermediate plate with said frame.

8. In a farm implement including a frame, a part rotatable therein, bearing means for the rotatable part, and a bearing-receiving member, the improvement residing in means connecting said bearing-receiving member to said frame comprising: upper, lower, and intermediate plates in general parallelism to one another, releasable clamping means mounted on said plates permitting shiftable movement of said intermediate plate relative to said upper and lower plates, an opening in each of said plates with each of said openings being registrable with the opening of the other plates, a pivot member extending through said openings, the opening in said intermediate plate being sufficiently large to permit shiftable and pivotal movement relative to said pivot member, the opening in said upper and lower plates being sufficient only to permit pivotal movement of said pivot member, means for fixing said pivot member to said bearing receiving member, and means fixing said intermediate plate to said frame.

9. In a farm implement including a frame, a part rotatable therein, bearing means for the rotatable part, and a bearing-receiving member, the improvement residing in means connecting said bearing-receiving member to said frame comprising: upper, lower, and intermediate plates in general parallelism to one another, releasable clamping means mounted on said plates permitting shiftable movement of said intermediate plate relative to said upper and lower plates, a pivot member pivotally connected to the upper and lower plates, means for fixing said pivot member to said bearing-receiving member, and means fixing said intermediate plate to said frame.

10. In a farm implement including a frame, a part rotatable therein, bearing means for the rotatable part and a bearing-receiving member, the improvement residing in clamping means connecting said bearing-receiving member to said frame, said clamping means comprising: a bracket fixed to said frame, plate means generally parallel to a portion of said bracket, releasable connecting means securing said portion of the bracket to said plate means and permitting shiftable movement of said plate means relative to said portion, and a pivot member fixed to said bearing-receiving member and pivotally connected to said plate means.

References Cited in the file of this patent

UNITED STATES PATENTS

| 1,006,972 | Monroe et al. | Oct. 24, 1911 |
| 1,147,281 | Trissel | July 20, 1915 |

FOREIGN PATENTS

| 986,380 | France | July 31, 1951 |